United States Patent [19]

Handley

[11] Patent Number: 4,774,069
[45] Date of Patent: Sep. 27, 1988

[54] PROCESS FOR THE MANUFACTURE OF NITRIC OXIDE

[75] Inventor: Jack R. Handley, Aylesbury, United Kingdom

[73] Assignee: Johnson Matthey Public Limited Company, London, England

[21] Appl. No.: 879,317

[22] Filed: Jun. 27, 1986

[30] Foreign Application Priority Data

Jun. 28, 1985 [GB] United Kingdom ............... 8516333

[51] Int. Cl.$^4$ .......................................... C01B 21/26
[52] U.S. Cl. .................................. 423/403; 428/225; 428/227; 428/292; 428/450; 428/469
[58] Field of Search ............... 423/403; 428/225, 227, 428/292, 450, 469

[56] References Cited

U.S. PATENT DOCUMENTS

| 971,149 | 9/1910 | Schick | 423/403 |
|---|---|---|---|
| 3,947,554 | 3/1976 | Senes et al. | 423/403 |
| 4,050,956 | 9/1977 | de Bruin et al. | 428/450 |
| 4,281,041 | 7/1981 | Koehler | 428/450 |
| 4,351,887 | 9/1982 | Bishop et al. | 423/403 |
| 4,511,539 | 4/1985 | Stephenson | 423/403 |

FOREIGN PATENT DOCUMENTS

| 1810555 | 6/1970 | Fed. Rep. of Germany . | |
|---|---|---|---|
| 24035 | of 1912 | United Kingdom | 423/403 |
| 464706 | 4/1937 | United Kingdom | 423/403 |

Primary Examiner—John Doll
Assistant Examiner—Wayne A. Langel
Attorney, Agent, or Firm—Cushman, Darby & Cushman

[57] ABSTRACT

A process for the manufacture of nitric oxide by the oxidation of ammonia using a catalyst (1) comprising platinum in which the ammonia conversion efficiency of the process is improved by the use of a palladium catchment trap (2) in which the conventional layers (8 and 10) of palladium scavenger-wire are adjacent to layers (7, 9 and 11) of interstitial (preferably woven) ceramics material. The preferred ceramics material consists of alumina, silica and boria. Also a catchment trap comprising layers of ceramics material for use in the process.

17 Claims, 1 Drawing Sheet

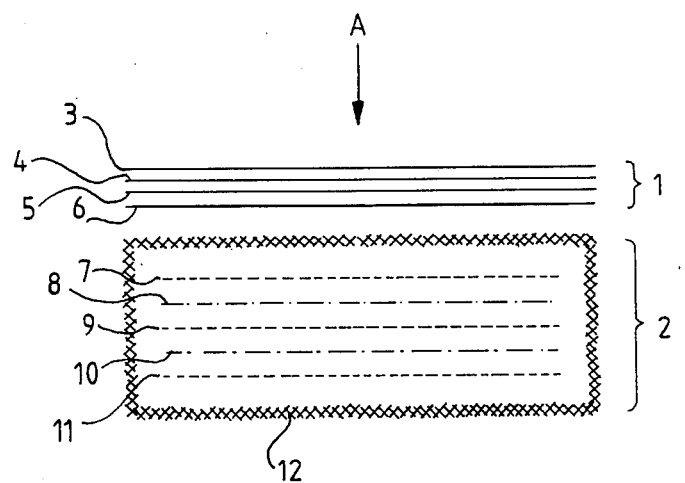

PROCESS FOR THE MANUFACTURE OF NITRIC OXIDE

This invention relates to a process for the manufacture of nitric oxide by oxidising ammonia in the presence of a catalyst comprising platinum and optionally a minor amount of rhodium and/or palladium, the catalyst being located upstream from a palladium (including palladium alloy) catchment trap for scavenging platinum or rhodium lost from the catalyst by volatilisation. The catchment trap is also known as a "getter" pack. The invention also relates to a palladium catchment trap for use in the process.

In the manufacture of nitric oxide by the oxidation of ammonia, a mixture of air and ammonia at 800° to 1200° C. is passed over an oxidation catalyst comprising platinum and 0 to 20 wt % of rhodium and/or 0 to 40 wt % of palladium (based on the weight of the alloy). The catalyst preferably comprises platinum and from 0 to 25 wt % of rhodium (based on the weight of the platinum). The catalyst is in the form of an interstitial matrix of platinum (including alloys of platinum with rhodium and/or palladium) usually formed by one or more gauzes or layers fabricated from elongated elements, for example wires. A simplified equation for the process is $$4NH_3 + 5O_2 \rightarrow 4NO + 6H_2O.$$

During operation of the process, small amounts of platinum and rhodium are lost from the catalyst because the metals react to form oxides which are volatile at the process operating temperatures. These volatile oxides are carried downstream with the nitric oxide and in the absence of a palladium catchment trap they would be lost somewhere in the plant.

These losses of platinum and rhodium are reduced by the palladium catchment trap positioned immediately downstream of the catalyst. Typically the catchment trap comprises interstitial scavenging layer composed of palladium elongated elements, for example palladium wire (known as scavenger-wire) interleaved with supporting gauzes of stainless steel. Palladium scavenger-wire may comprise palladium alone or an alloy of palladium with for example 0 to 20 wt % of gold and 0 to 25 wt % of nickel and 0 to 25 wt % of platinum and/or 0 to 25 wt % of rhodium and possibly 0 to 5 wt % of zirconia, yttria, alumina, magnesia or thoria (the percentages being based on the total weight of the alloy).

Generally a nitric oxide manufacturing plant requires between 2 and 40 and preferably between 4 and 25 platinum catalyst gauzes (including gauzes made from alloys of platinum with rhodium and/or palladium) to operate effectively. Both platinum and rhodium are expensive and so one objective of this invention is to reduce the amount of platinum and rhodium present as the catalyst used in the nitric oxide process. Another objective is to provide a palladium catchment trap which reduces the amount of platinum and rhodium needed for use as an ammonia oxidation catalyst.

Accordingly this invention provides a process for the manufacture of nitric oxide by oxidising ammonia in the presence of a catalyst comprising platinum and from 0 to 20 wt % of rhodium and from 0 to 40 wt % of palladium (based on the weight of alloy), the catalyst being located upstream from a palladium catchment trap for scavenging platinum or rhodium lost from the catalyst by volatilisation wherein the catchment trap comprises at least one interstitial layer of elongated elements (for example woven scavenger-wire) made from palladium or an alloy of palladium adjacent at least one layer of interstitial ceramics material.

This invention also provides a catchment trap for use in the manufacture of nitric oxide by oxidising ammonia in the presence of a platinum-based catalyst wherein the catchment trap comprises at least one layer of interstitial elongated elements made from palladium or an alloy of palladium supported on at least one layer of interstitial ceramics material which is preferably a layer of ceramic fibres which may be in the form of a woven cloth where the interstices are provided by the gaps in the weave. Preferably the catchment trap comprises at least five interstitial layers of palladium elongated elements interleaved with layers of interstitial ceramics material. Usually the trap will comprise from 2 to 30 layers of palladium scavenger-wire interleaved with a corresponding number of layers of interstitial ceramics material. Preferably the layers of the catchment trap are enclosed by a metal gauze wrapping.

Operating the process with a catalyst and catchment trap as above seems to improve the efficiency of the process. In particular the conversion efficiency of catalysts comprising both platinum and rhodium has been found to improve because of a reduction in the phenomenon known as "rhodium enrichment". Rhodium enrichment reduces the efficiency of the catalyst and it can occur in two ways. Firstly rhodium enrichment may occur when the temperature of a portion of the catalyst falls to temperatures at which the volatilisation of rhodium is slower than that at which platinum volatilises and hence this cooler portion of the catalyst becomes richer in rhodium. Alternatively if this cooler portion of the catalyst is downstream of a hotter portion it may cause condensation of any rhodium which has volatilised from the hotter portion and hence this too can cause rhodium enrichment. It now appears that this reduction in rhodium enrichment may be due to a reflection of heat by the ceramics layers.

A further advantage of catchment traps in which the palladium elongated elements are adjacent to interstitial ceramics material is that there is little if any bonding between the elongated elements and the ceramics material during operation of the nitric oxide process and so the elongated elements are easily separated from the ceramics material when the time comes to recover the scavenged platinum and rhodium. In contrast, conventional catchment traps now in use have the elongated elements supported on stainless steel gauzes which often sinter onto the elongated elements especially during their use in plants operating the high pressure nitric oxide process. This means that expensive chemical separation techniques need to be used in order to separate the palladium and its scavenged metals from the stainless steel.

Catchment traps comprising layers of interstitial ceramics material also have the advantage of being much lighter in weight than corresponding traps comprising stainless steel layers.

The layers of ceramics material preferably comprise intercrossing threads which define the interstices and which may be woven, knitted or felted to give cloth having an open area of from 10 (or preferably 30) to 60%. A simple weave gives a mesh size of from 9 to 1024 interstices cm$^{-2}$. Each thread preferably comprises a body of (for example spun or twisted) fibres, each fibre having a diameter of from 2 to 100 μm and especially 2 to 20 μm. 1 μm is $10^{-6}$m.

The ceramics material should be stable at temperatures of from 800° to 1200° C. and it must be inert to the metals of the platinum group, especially platinum, rhodium and palladium. Suitable ceramics include alumina, silica, zirconia, boria, magnesia, titania, yttria, berylia, thoria, manganosite, lanthana, scandia, calcium oxide, uranium oxide, chromium oxide, niobium oxide, hafnium oxide or corresponding borides, carbides, silicates, nitrides or various silicates or any combination of these. A preferred ceramics composition comprises alumina, 0.1 to 30 wt % (preferably 15 to 30 wt %) silica and 0 (preferably 1) to 15 wt % boria. It is particularly preferred to use a ceramics composition with a silica content as low as possible because silica promotes formation of rhodium oxide and for this reason the most preferred silica content is from 0.1 to 5 wt %. An alternative material is zirconia which has been found to be relatively inert to platinum.

The layers in the catalyst assembly are preferably woven from a platinum/rhodium alloy comprising from 5 to 20 wt % (based on the weight of the alloy) of rhodium. A simple weave is preferred giving a mesh size of from 49 to 1600 and preferably 49 to 1024 interstices $cm^{-2}$. The open area of the mesh is preferably from 20 (or preferably 30) to 70 %. Preferably the catalyst assembly will comprise from 3 to 40 layers.

The invention is illustrated by the following embodiment which is described with reference to the drawing which is a schematic cross-section of a catalyst pack in tandem with a catchment trap suitable for use in the process for the manufacture of nitric oxide.

The drawing shows a catalyst pack 1 assembled in tandem with a catchment trap 2 suitable for use in the manufacture of nitric oxide. Catalyst pack 1 comprises four catalyst layers 3, 4, 5 and 6 composed of wire of diameter 0.076 mm woven to produce a gauze of mesh size 1024 interstices $cm^{-2}$. The wire is made from an alloy of platinum with 10 wt % (based on the weight of alloy) of rhodium. Catchment trap 2 comprises three ceramic layers 7, 9 and 11, and two layers of palladium scavenger-wire 8 and 10 all wrapped in a heat-resistant metallic gauze 12. Ceramic layers 7, 9 and 11 are made from a ceramic material comprising 62 wt % alumina, 24 wt % silica and 14 wt % boria. The ceramic material is in the form of fibres of diameter 8 to 10 μm spun into a thread which is woven to produce a gauze of mesh size 9 interstices $cm^{-2}$ which give the gauze an open area of 47%. The layers of palladium scavenger-wire 8 and 10 consist of wire of diameter 0.080 mm woven into a gauze of mesh size 1024 interstices $cm^{-2}$.

The catalyst pack 1 is assembled in tandem and upstream of the catchment pack 2. The direction of flow of the mixture of air and ammonia is shown by arrow A.

The catchment trap 2 is separate from any catalyst pack and so can be transported, stored or installed in a process for the manufacture of nitric oxide independently of the catalyst pack.

The invention is further illustrated by the following examples of which Examples A to C are comparative.

EXAMPLE 1 AND COMPARATIVE EXAMPLES A AND B

These examples illustrate how the efficiency of the catalyst is improved by the presence of a catchment trap comprising interstitial ceramics material.

For the purposes of Example 1, a catalyst pack assembled in tandem with a catchment trap of the type shown in the drawing was used in the manufacture of nitric oxide. The catalyst pack consisted of four layers of woven platinum/rhodium wire made from an alloy of platinum with 10 wt % (based on the weight of alloy) of rhodium. All the layers in the catalyst pack were made from wire of diameter 0.076 mm woven into a gauze of mesh size 1024 interstices $cm^{-2}$ which give the cloth an open area of 57%.

The catchment trap consisted of three layers of interstitial ceramics cloth interleaved with two layers of palladium scavenger-wire. The ceramics cloth consisted of a ceramics material composed of 62 wt % alumina, 24 wt % silica and 14 wt % boria formed into fibres of diameter 11 μm which in turn were spun into threads and woven to make a cloth of mesh size 50 interstices $cm^{-2}$ which gave the cloth an open area of 52.6%.

The palladium layers consisted of palladium wire of diameter 0.080 mm woven into a gauze of mesh size 1024 interstices $cm^{-2}$ giving an open area of 55%. The catchment pack was wrapped in a heat-resistant woven metal gauze.

The performance of the catalyst pack in tandem with the catchment trap was tested in the manufacture of nitric oxide as follows.

A reactant mixture consisting of air containing 10 volume % ammonia was passed through the tandem assembly at a pressure of 4 bar. The reactant mixture was heated to 270° C. before entry into the catalyst pack. The conversion efficiencies for the conversion of ammonia to nitric oxide are conventionally expressed in terms of the amount of nitric acid which can be obtained from the nitric oxide after it has been oxidised to nitrogen dioxide and dissolved in water. Therefore the amount of nitric acid which would be obtained for various reactant feed rates was determined and is shown in Table 1. In Table 1 the reactant feed rate is expressed as that feed rate which (assuming perfect conversion of the ammonia to nitric acid) would be needed per $m^2$ of cross-sectional area of the reaction zone in order to produce per day the notional amounts of nitric acid shown in Table 1.

For the purposes of Comparative Example A, the procedure of Example 1 was repeated except that the catchment trap comprised three layers of heat-resistant metal gauze instead of the three layers of ceramics material. The conversion efficiencies obtained are shown in Table 1.

For the purposes of Comparative Example B, the procedure of Example 1 was repeated except that the catchment trap was omitted and the size of the catalyst pack was increased to nine gauzes. Again the conversion efficiencies obtained are shown in Table 1.

TABLE 1

| | REACTANT FEED RATE EXPRESSED AS NOTIONAL AMOUNT OF ACID PRODUCED ASSUMING PERFECT CONVERSION (Tonnes $m^{-2}$ $day^{-1}$) | | | | | | |
|---|---|---|---|---|---|---|---|
| | 10 | 12 | 14 | 16 | 18 | 20 | 24 |
| Example | Actual Conversion Efficiencies Achieved expressed as % of Perfect Conversion | | | | | | |
| 1 | — | 96.20 | — | 95.44 | — | 94.80 | 94.49 |
| A | — | 92.53 | — | 88.25 | — | — | — |
| B | 96.3 | — | 94.1 | — | 94.3 | 95.1 | — |

By Comparing the results from Examples 1 and A as shown in Table 1, it can be seen that using a catchment trap comprising ceramics layers instead of metal gauze layers leads to an increase in the conversion efficiency of the catalyst. By comparing Examples 1 and B it can be seen that it is necessary to increase the size of the catalyst pack by more than double in order to match the conversion efficiencies obtaineable in the presence of the catchment pack comprising interstitial ceramics material.

What I claim is:

1. A process for the manufacture of nitric oxide by oxidising ammonia in the presence of a catalyst comprising platinum and from 0 to 20 wt % of rhodium and from 0 to 40 wt % of palladium (based on the weight of alloy), the catalyst being located upstream from a palladium catchment trap for scavenging platinum or rhodium lost from the catalyst by volatilisation wherein the catchment trap comprises at least one interstitial layer of elongated elements made from palladium or an alloy of palladium adjacent at least one layer of interstitial ceramics material.

2. A process according to claim 1 wherein the catchment trap comprises from 2 to 30 layers of palladium elongated elements interleaved by layers of interstitial ceramics material.

3. A process according to claim 1 wherein each layer of ceramics material comprises intercrossing ceramics threads which define the interstices of the interstitial ceramics material.

4. A process according to claim 3 wherein the threads make up a woven cloth.

5. A process according to claim 3 wherein the open area of of the interstitial ceramics material is from 20 to 60%.

6. A process according to claim 1 wherein the ceramics material comprises at least one compound selected from the group consisting of the oxides, borides, carbides, silicides, nitrides and silicates of aluminum, zirconium, boron, silicon, magnesium, titanium, yttrium, beryllium, thorium, manganese, lanthanum, scandium, calcium, uranium, chromium, niobium and hafnium.

7. A process according to claim 6 wherein the ceramics material is a composition comprising alumina, 0.1 to 30 wt % silica and 0 to 15 wt % boria.

8. A process according to claim 6 wherein the ceramics material comprises zirconia.

9. A catchment trap for use in the manufacture of nitric oxide by oxidising ammonia in the presence of a platinum-based catalyst wherein the catchment trap comprises at least one interstitial layer of elongated elements made from palladium or an alloy of palladium supported on at least one layer of interstitial ceramics material.

10. A trap according to claim 9 which comprises from 2 to 30 layers of the elongated elements interleaved by layers of interstitial ceramics material.

11. A trap according to claim 9 wherein each layer of interstitial ceramics material comprises intercrossing ceramics threads which define the interstices of the interstitial ceramics material.

12. A trap according to claim 11 wherein the threads make up a woven cloth.

13. A trap according to claim 9 wherein the open area of the interstitial ceramics material is from 20 to 60%.

14. A trap according to claim 13 wherein the ceramics material comprises at least one compound selected from the group consisting of the oxides, borides, carbides, silicides, nitrides and silicates of aluminum, zirconium, boron, silicon, magnesium, titanium, yttrium, beryllium, thorium, manganese, lanthanum, scandium, calcium, uranium, chromium, niobium and hafnium.

15. A trap according to claim 13 wherein the ceramics material is a composition comprising alumina, 0.1 to 30 wt % silica and 0 to 15 wt % boria.

16. A trap according to claim 13 wherein the ceramics material comprises zirconia.

17. A trap according to any one of claims 9 when enclosed within a heat-resistant metal gauze wrapping.

* * * * *